(12) United States Patent
Hata et al.

(10) Patent No.: US 6,533,964 B1
(45) Date of Patent: Mar. 18, 2003

(54) POLYMER, BINDER RESIN, COMPOSITION FOR IONICALLY CONDUCTIVE POLYMER ELECTROLYTE, AND SECONDARY BATTERY

(75) Inventors: Kimiyo Hata, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/701,033

(22) PCT Filed: Mar. 22, 2000

(86) PCT No.: PCT/JP00/01733

§ 371 (c)(1),
(2), (4) Date: Nov. 22, 2000

(87) PCT Pub. No.: WO00/56780

PCT Pub. Date: Sep. 28, 2000

(30) Foreign Application Priority Data

Mar. 23, 1999 (JP) ............................................. 11-078086

(51) Int. Cl.[7] .............................. H01B 1/06; H01B 1/20
(52) U.S. Cl. ................... 252/511; 252/500; 252/511; 252/518.1; 252/519.3; 252/521.6; 429/104; 429/105; 429/128; 429/188; 429/304; 429/317; 429/321; 429/322; 525/58; 525/59; 525/60; 525/61
(58) Field of Search .............. 525/58–61; 252/500, 252/511, 518.1, 519.3, 521.6; 429/104, 105, 128, 188, 304, 317, 321, 322

(56) References Cited

U.S. PATENT DOCUMENTS

| | | | | |
|---|---|---|---|---|
| 4,978,713 A | * | 12/1990 | Goldenberg | 525/61 |
| 5,158,810 A | * | 10/1992 | Oishi et al. | 525/60 |
| 5,789,106 A | * | 8/1998 | Rosenmeier et al. | 252/62.2 |
| 5,849,840 A | * | 12/1998 | Maruhashi et al. | 525/60 |

FOREIGN PATENT DOCUMENTS

| | | |
|---|---|---|
| JP | 4-296347 | 10/1992 |
| JP | 5-320330 | 12/1993 |
| JP | 6-150941 | 5/1994 |
| JP | 10-338714 | 11/1998 |
| JP | 11-279498 | 10/1999 |

\* cited by examiner

Primary Examiner—Mark Kopec
Assistant Examiner—Kallambella Vijayakumar
(74) Attorney, Agent, or Firm—Birch, Stewart, Kolasch & Birch, LLP

(57) ABSTRACT

The invention provides a novel polymeric compound comprising polyvinyl alcohol units and having an average degree of polymerization of at least 20, in which some or all of the hydroxyl groups on the polyvinyl alcohol units are substituted with oxyalkylene-containing groups to an average molar substitution of at least 0.3; a binder resin composed of this polymeric compound; an ion-conductive polymer electrolyte composition having a high ionic conductivity and high tackiness which lends itself well to use as a solid polymer electrolyte in film-type cells and related applications; and a secondary cell.

11 Claims, 2 Drawing Sheets

POLYMER, BINDER RESIN, COMPOSITION FOR IONICALLY CONDUCTIVE POLYMER ELECTROLYTE, AND SECONDARY BATTERY

This application is the national phase under 35 U.S.C. §371 of PCT International Application No. PCT/JP00/01733 which has an International filing date of Mar. 22, 2000 which designated the United States of America, the entire contents of which are hereby incorporated by reference.

TECHNICAL FIELD

The present invention relates to novel polymeric compounds, binder resin composed of the polymeric compounds, and polymer electrolyte compositions having a high ionic conductivity and tackiness, and secondary cells.

BACKGROUND ART

Electrolytes used in electrochemical devices such as secondary cells have until now been primarily low-molecular-weight substances that are liquid at or above room temperature, such as water, ethylene carbonate, propylene carbonate, and tetrahydrofuran. In lithium-type cells in particular, use is commonly made of low-molecular-weight organic liquid electrolytes which tend to evaporate, ignite and burn rather easily. To ensure long-term stability, a metal can must be used as the outer cell enclosure so as to increase the airtightness of the container. The result has been a considerable rise in the weight of electrical and electronic components which use low-molecular-weight organic liquid electrolytes, and a complex production process.

By contrast, the use of a polymer as the electrolyte allows electrolytes to be obtained which have a very low volatility and are not prone to evaporation. Moreover, such "polymer electrolytes" that have a sufficiently high molecular weight can even be used as solid electrolytes which are not fluid at or above room temperature. They offer the dual advantage of serving as a solvent for ion-conductive salts and of solidifying the electrolyte.

As an example of this type of polymer electrolyte, in 1978, Armond et al. at l'Université de Grenoble in France discovered that lithium perchlorate dissolves in solid polyethylene oxide, and reported that when 1 M lithium salt is dissolved in polyethylene oxide having a molecular weight of about 2,000, the resulting complex exhibits an ionic conductivity at room temperature of about $10^{-7}$ S/cm. Another group reported that when 1 M lithium salt is dissolved in polyethylene oxide having a molecular weight of about 200, which is liquid at room temperature, the ionic conductivity at room temperature is about $10^{-4}$ to $10^{-5}$ S/cm. Thus, it is known that polymeric substances such as polyethylene oxide with the ability to dissolve ion-conductive salts function as electrolytes.

Since then, similar research has been carried out on a broad range of largely polyethylene oxide-related polymers, such as polypropylene oxide, polyethyleneimine, polyurethane and polyester.

As noted above, polyethylene oxide, the most thoroughly investigated of these polymers, has a good ability to dissolve ion-conductive salts. However, because it is a semi-crystalline polymer, when a large amount of metallic salt is dissolved therein, the salt forms a pseudo-crosslinked structure between the polymer chains that leads to crystallization of the polymer. As a result, the actual ionic conductivity is much lower than the predicted value.

This is because an ion conductor dissolved in a linear polyether-based polymer matrix such as polyethylene oxide migrates with the local movement of polymer chain segments within amorphous regions of the polymer matrix. With the formation of a pseudo-crosslinked structure, the cations which carry the ionic conductivity are strongly coordinated by the polymer chains, greatly reducing cation mobility and thus lowering the conductivity. Such local movement of the polymer chains is referred to as Brawnian motion.

For this reason, a linear polyether-based polymer such as polyethylene oxide is a poor choice as the matrix polymer for an ion-conductive polymer electrolyte.

In fact, according to the literature to date, ion-conductive polymer electrolytes composed entirely of linear polymers such as polyethylene oxide, polypropylene oxide and polyethyleneimine generally have an ionic conductivity at room temperature of about $10^{-7}$ S/cm, and at best not higher than about $10^{-6}$ S/cm.

To obtain ion-conductive polymer electrolytes having such a high conductivity, a molecule must be designed which allows the existence within the matrix polymer of many amorphous regions of good ion conductor mobility, and which does not crystallize even when an ion-conductive salt is dissolved therein to a high concentration.

One such method is the attempt, described by N. Ogata et al. (*Sen'i Gakkaishi*, pp. 52–57, 1990), to introduce a branched structure into polyethylene oxide. Their work demonstrates that polyethylene oxide derivative-based ion-conductive solid polymer electrolytes having a high ionic conductivity (about $10^{-4}$ S/cm at room temperature) can indeed be synthesized. However, such polymer electrolytes have not been commercialized on account of the sheer complexity of the polymer synthesis method involved.

The inventor previously disclosed that polymer electrolyte-forming polymers having a high ionic conductivity can be prepared by introducing polyoxyalkylene branched chains onto a natural polymeric substance such as cellulose and capping the terminal hydroxyl groups with suitable substituents, and that such polymers can be used to form solid polymer electrolytes having an excellent strength and a high conductivity (JP-A 8-225626 and JP-A 9-50824).

However, solid polymer electrolytes in which polyoxyalkylene branched chains have been introduced onto a natural polymeric substance such as cellulose have two drawbacks: (1) because the molecular weight per polymer chain (backbone) unit is high, any further increase in the fraction of polyoxyalkylene segments, which is where ion-conductive salt dissolution and migration takes place, per unit weight of the natural polymeric substance is difficult to achieve; and (2) the tackiness tends to be somewhat poor.

DISCLOSURE OF THE INVENTION

The present invention was conceived in light of these circumstances. One object of the invention is to provide a novel polymeric compound; and a binder resin compose of the polymeric compound. Another object is to provide a polymer electrolyte-forming polymer composed of the novel polymeric compound. Yet another object is to provide an ion-conductive polymer electrolyte composition endowed with high ionic conductivity and high tackiness which lends itself well to use as a solid polymer electrolyte in applications such as film-type cells; and a secondary cell comprising the binder resin and the ion-conductive polymer electrolyte composition.

The inventor has conducted extensive and repeated investigations in order to achieve these aims. As a result, the inventor has discovered that an effective way to raise the ionic conductivity within a polymer electrolyte-forming polymer is to increase the proportion per unit weight of polymer electrolyte-forming polymer in which polyoxyalkylene segments capable of dissolving an ion-conductive salt are introduced onto the polymer.

That is, a typical example in which polyoxyalkylene branched chains are introduced onto a conventional natural polymeric substance such as cellulose might involve the introduction of a 10-mole unit length polyoxyethylene group per cellulose unit. In this case, the molecular weight of the cellulose recurring units ($C_6H_{10}O_5$) is 162 and the molecular weight of the 10-mole polyoxyethylene groups (($CH_2CH_2O)_{10}$—H) is 441. Hence, the fraction represented by the polyoxyethylene groups, which are the portions of the polymer that dissolve the ion-conductive salt, relative to the unit weight of the resulting cellulose derivative (polyoxyethylene fraction) is given by the ratio 441/(441+161)=0.733.

By contrast, if a polymeric compound such as polyvinyl alcohol (PVA), having a unit molecular weight lower than natural polymeric substances such as cellulose is used as the backbone, given that the molecular weight of the PVA recurring units ($CH_2CH(OH)$) is 44 and the molecular weight of the 10-mole polyoxyethylene groups (($CH_2CH_2O)_{10}$—H) is 441, a higher polyoxyethylene fraction of 441/(441+44)=0.909 is achieved. The higher polyoxyethylene fraction enables a greater amount of ion-conductive salt to be dissolved, in addition to which the molecule has a larger number of polyoxyethylene segments where ion migration occurs, increasing ion mobility. The inventor has thus found that a high ionic conductivity can be attained in this way.

Also, when a film-type cell, for example, is assembled using a solid polymer electrolyte, in order for the solid polymer electrolyte to additionally serve as the binder component for the cell, the electrolyte must have both a high ionic conductivity, and the ability to bind the powdery battery active material. That is, it must be tacky. Moreover, film-type batteries made with solid polymer electrolytes generally have a positive electrode/solid electrolyte/negative electrode construction. Unlike cylindrical batteries in which this positive electrode/solid electrolyte/negative electrode composite is coiled and placed in a can, the absence of a coiling pressure in film-type batteries means that pressure is not applied between the positive electrode and the solid electrolyte and between the solid electrolyte and the negative electrode, allowing the solid electrolyte to separate readily from the positive electrode and the negative electrode. For this reason as well, the solid electrolyte placed between the positive electrode and the negative electrode, in addition to serving as an electrolyte, must also have the ability to strongly bond the positive and negative electrodes. In other words, it must have tackiness.

Pursuing their investigations even further in light of such considerations, the inventor has found also that polymeric compounds containing polyvinyl alcohol units of general formula (1) below and having an average degree of polymerization of at least 20 in which some or all of the hydroxyl groups on the polyvinyl alcohol units are substituted with oxyalkylene-containing groups to an average molar substitution of at least 0.3, and especially such polymeric compounds in which some or all of the hydroxyl groups on the molecule are additionally capped with one or more type of monovalent group selected from among halogen atoms, substituted or unsubstituted monovalent hydrocarbon groups of 1 to 10 carbons, acyl groups, triorganosilyl groups, amino groups, alkylamino groups and phosphorus-containing groups, have the ability to dissolve a large amount of ion-conductive salt because of their high oxyalkylene fraction. Moreover, the presence in the molecule of more oxyalkylene segments over which the ions can migrate increases ion mobility, enabling a high ionic conductivity to be achieved. Also, these polymeric compounds have a high tackiness which allows them to function well as a binder component that firmly bonds the positive and negative electrodes. The inventor has thus discovered that compositions comprising an ion-conductive salt dissolved to a high concentration in a binder resin composed of such a polymeric compound are ideally suited for use as a solid polymer electrolyte in film-type batteries and related applications.

Accordingly, the present invention provides:

(1) a polymeric compound comprising polyvinyl alcohol units of general formula (1):

wherein n represents a number of at least 20, and having an average degree of polymerization of at least 20, characterized in that some or all of the hydroxyl groups on the polyvinyl alcohol units are substituted with oxyalkylene-containing groups to an average molar substitution of at least 0.3;

(2) a binder resin composed of the above polymeric compound;

(3) an ion-conductive polymer electrolyte composition comprising primarily the same polymer electrolyte-forming polymer (that is, the foregoing polymeric compound) and an ion-conductive salt; and (4) a secondary cell comprising a positive electrode, a negative electrode and a solid polymer electrolyte layer, characterized in that the solid polymer electrode layer is composed of the above ion-conductive polymer electrolyte composition and lies between the positive electrode and the negative electrode.

BEST MODE FOR CARRYING OUT THE INVENTION

Figure 1:
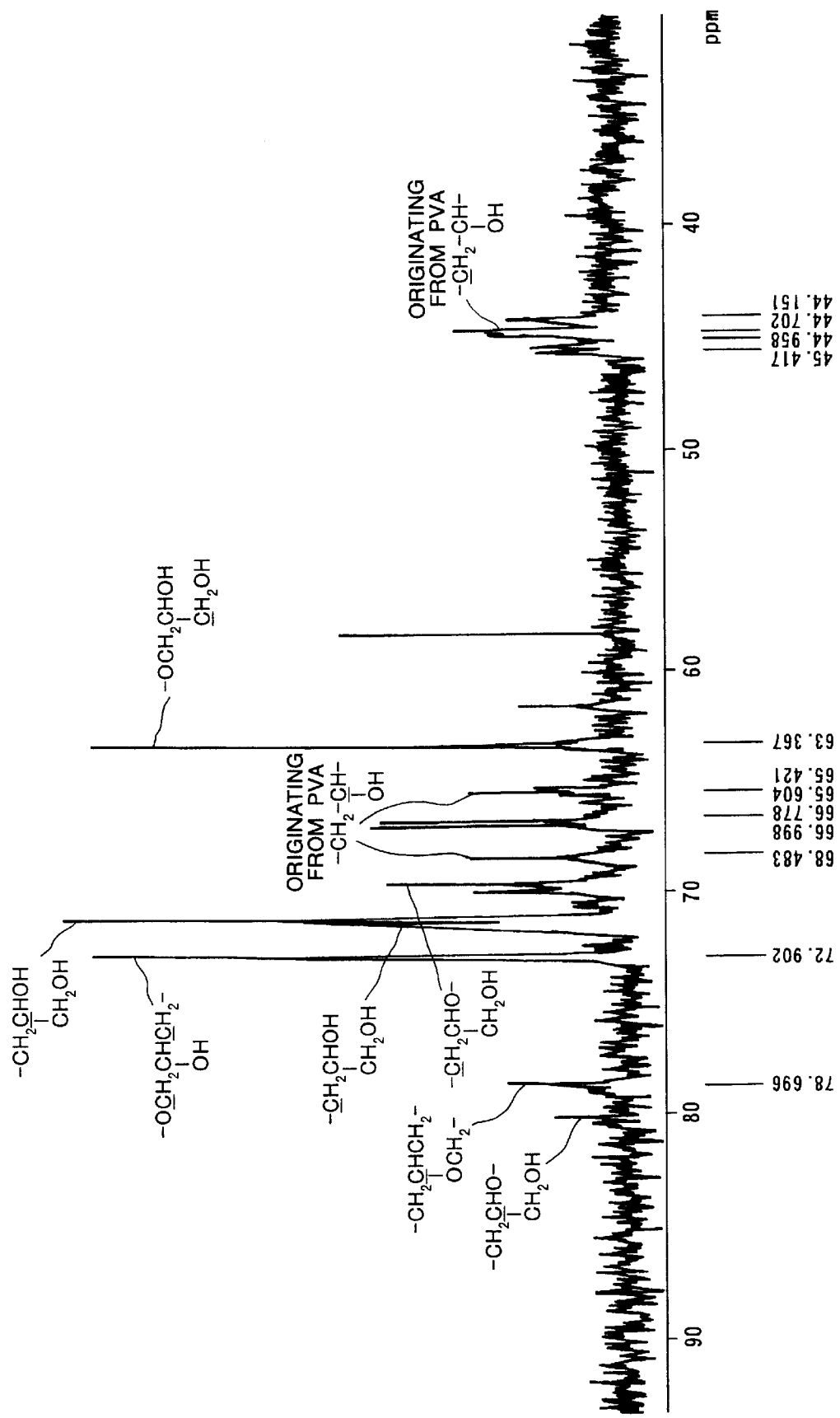
FIG. 1 is a $^{13}$C-NMR spectrum of the dihydroxypropylated polyvinyl alcohol prepared in Example 1 of the invention.

The invention is described more fully below.

The polymeric compound of the invention contains polyvinyl alcohol units and has an average degree of polymerization of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and especially no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

The above polyvinyl alcohol units make up the backbone of the inventive polymeric compound and have the following general formula (1).

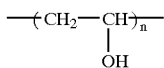  (1)

In formula (1), the letter n is at least 20, preferably at least 30, and most preferably at least 50. The upper limit for n is preferably no higher than 2,000, and especially no higher than 200.

It is highly advantageous for the polyvinyl alcohol unit-containing polymeric compound of the invention to be a homopolymer which satisfies the above range in the average degree of polymerization and in which the fraction of polyvinyl alcohol units in the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, poly(ethylene vinyl alcohol), partially saponified polyvinyl acetate, and other modified polyvinyl alcohols.

Some or all of the hydroxyl groups on the polyvinyl alcohol units of the polymeric compound according to the invention are substituted with oxyalkylene-containing groups (some of the hydrogen atoms on which oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of PVA is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the —OH groups on the original —(CH$_2$CH(OH))— units have become —O—(CH$_2$CH$_2$O)$_n$— groups, and so the unit molecular weight of the reaction product is 44+44n. Because the increase in weight associated with the reaction is represented by 44n, the calculation is carried as follows.

PVA/PVA derivative=44/(44+44$n$)=10 g/15 g

440+440n=660 n=0.5

Hence, the molar substitution (MS) in this example is 0.5. Of course, this value merely represents the average molar substitution. That is, values such as the quantity of unreacted PVA units on the molecule and the length of the oxyethylene groups introduced by the reaction cannot be specified in this way.

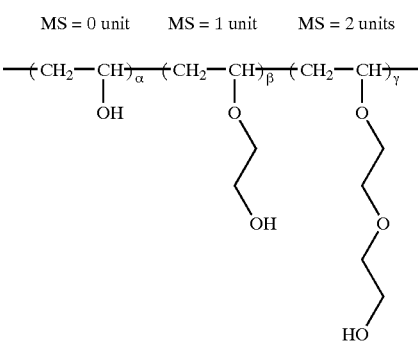

$\alpha + \beta + \gamma = 1$

Average MS=(0+1+2)/3=1

Examples of suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent at the end.

In above method (1), the oxirane compound may be any one or combination selected from among ethylene oxide, propylene oxide and glycidol.

If ethylene oxide is reacted in this case, one or more oxyethylene chain is introduced onto the polymeric compound as shown in the following formula.

In the formula, "a" is preferably from 1 to 10, and most preferably from 1 to 5.

If propylene oxide is reacted instead, one or more oxypropylene chain is introduced onto the polymeric compound as shown below.

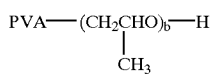

In the formula, "b" is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: "a-attack" and "b-attack." The reaction of one glycidol molecule creates two new hydroxyl groups, each of which can in turn react with glycidol. As a result, the two following branched chains (1) and (2) are introduced onto the hydroxyl groups of the PVA units.

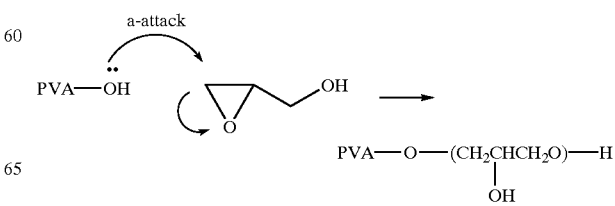

-continued

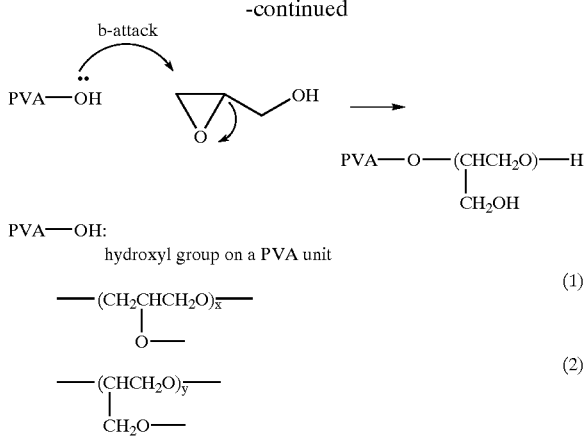

PVA—OH:
    hydroxyl group on a PVA unit

—(CH$_2$CHCH$_2$O)$_{\overline{x}}$—
    |
    O—

(1)

—(CHCH$_2$O)$_{\overline{y}}$—
|
CH$_2$O—

(2)

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described below as an illustrative example. First, the reaction vessel is charged with a solvent and polyvinyl alcohol. It is not essential in this case for the polyvinyl alcohol to be dissolved in the solvent. That is, the polyvinyl alcohol may be present in the solvent either in a uniformly dissolved state or in a suspended state. A given amount of a basic catalyst, such as aqueous sodium hydroxide, is added and stirred for a while into this solution, following which glycidol diluted with a solvent is added. Reaction is carried out at a given temperature for a given length of time, after which the polyvinyl alcohol is removed. If the polyvinyl alcohol is present within the reaction mixture in undissolved form, it is separated off by filtration using a glass filter, for example. If, on the other hand, the polyvinyl alcohol is dissolved within the reaction mixture, it is precipitated out of solution by pouring an alcohol or other suitable precipitating agent into the reaction mixture, following which the precipitate is separated off using a glass filter, for example. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (2).

A—(R$^2$O)$_m$—R$^3$ (2)

In formula (2), the letter A represents a monovalent substituent having reactivity with hydroxyl groups. Illustrative examples include isocyanate groups, epoxy groups, carboxylic groups, carboxylic acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and carboxylic acid chloride groups are preferred for their reactivity.

The carboxylic group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as an isocyanate group or an epoxy group, may be bonded directly to the oxyalkylene group R$^2$O or through, for example, an intervening oxygen atom, sulfur atom, carbonyl group, carbonyloxy group, nitrogenous group (e.g., NH—, N(CH$_3$)—, N(C$_2$H$_5$)—) or SO$_2$ group. Preferably, the hydroxy-reactive group is bonded to the oxyalkylene group R$^2$O through an intervening group such as an alkylene, alkenylene or arylene group having 1 to 10 carbons, and especially 1 to 6 carbons.

Examples of polyoxyalkylene groups bearing this type of substituent A that may be used are the products obtained by reacting polyisocyanate compounds at the hydroxyl end group on a polyoxyalkylene group. Isocyanate group-bearing compounds that may be used in this case include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds such as may be obtained from the following reaction.

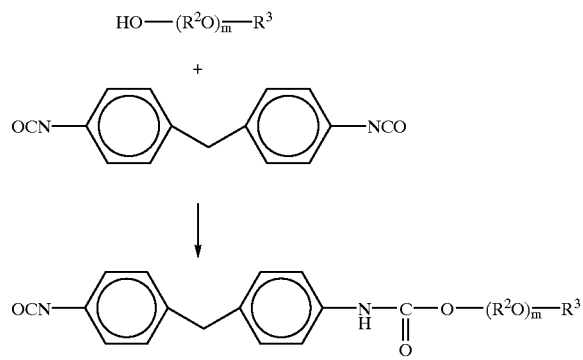

In the formula, R$^2$O is an oxyalkylene group of 2 to 5 carbons, examples of which include —CH$_2$CH$_2$O—, —CH$_2$CH$_2$CH$_2$O—, —CH$_2$CH(CH$_3$)O—, —CH$_2$CH(CH$_2$CH$_3$)O— and —CH$_2$CH$_2$CH$_2$CH$_2$O—. The letter m represents the number of moles of the oxyalkylene group that are added. This number of added moles (m) is preferably from 1 to 100, and most preferably from 1 to 50.

Here, the polyoxyalkylene chain represented by the above formula (R$^2$O)$_m$ is most preferably a polyethylene glycol chain, a polypropylene glycol chain or a polyethylene oxide (EO)/polypropylene oxide (PO) copolymer chain. The weight-average molecular weight of these polyoxyalkylene chains is preferably from 100 to 3,000, and most preferably within the weight-average molecular weight range of 200 to 1,000 at which the polyalkylene chain is liquid at room temperature.

R$^3$ in the above formula is a capping moiety for one end of the chain. This represents a hydrogen atom, a substituted or unsubstituted monovalent hydrocarbon group having 1 to 10 carbons, or a R$^4$CO— group (wherein R$^4$ is a substituted or unsubstituted monovalent hydrocarbon group having 1 to 10 carbons).

Illustrative examples of the substituted or unsubstituted monovalent hydrocarbon groups having 1 to 10 carbons that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted groups in which some or all of the hydrogen atoms on the above groups have been substituted with halogen atoms such as fluorine, bromine or chloride, cyano, hydroxyl, $H(OR^2)_z$— (wherein $R^2$ is an alkylene having 2 to 4 carbons, and z is an integer from 1 to 100), amino, aminoalkyl or phosphono. Specific examples of such substituted groups include cyanoethyl, cyanobenzyl, substituted groups in which cyano is bonded to other alkyl groups, chloromethyl, chloropropyl, bromoethyl and trifluoropropyl. These may be used alone or as combinations of two or more thereof. The monovalent hydrocarbon group is preferably one having from 1 to 8 carbons.

Illustrative examples of $R^4CO$— groups that may be used as the capping moiety include those in which $R^4$ is a substituted or unsubstituted monovalent hydrocarbon group. Preferred examples of $R^4$ include alkyl or phenyl groups which may be substituted with cyano, acyl groups, benzoyl groups and cyanobenzoyl groups.

The reaction in method (2) between the above-described polyvinyl alcohol unit-containing polymeric compound and the above-described polyoxyalkylene compound having a hydroxy-reactive substituent at the end may be carried out in the same manner as the reaction carried out with an oxirane compound in method (1).

In the reaction, the molar ratio between the polyvinyl alcohol and the polyoxyalkylene compound having a hydroxy-reactive substituent at the end is preferably from 1:1 to 1:20, and most preferably from 1:1 to 1:10.

The structure of the polymeric compound of the invention in which oxyalkylene-containing groups have been introduced onto polyvinyl alcohol units can be verified by $^{13}C$-NMR spectroscopy. For example, when dihydroxypropylated polyvinyl alcohol prepared by reacting polyvinyl alcohol with glycidol is analyzed by $^{13}C$-NMR (DEPT spectrum measured using a Varian VXR-300 NMR spectrometer, with $D_2O$ as the solvent), the spectrum includes peaks for PVA and peaks for dihydroxypropyl groups originating from the glycidol, as shown in FIG. 1.

The extent to which the oxyalkylene chain-bearing polyvinyl alcohol unit-containing polymeric compound of the invention contains oxyalkylene groups can be determined in this case using various analytical techniques such as NMR or elemental analysis, although a method of determination based on the weight of the polymer charged as a reactant and the increase in weight of the polymer formed by the reaction is simple and convenient. For example, the yield may be determined by precisely measuring both the weight of the polyvinyl alcohol unit-containing polymeric compound charged into the reaction and the weight of the oxyalkylene chain-bearing polyvinyl alcohol unit-containing polymeric compound obtained from the reaction, then using this difference to calculate the quantity of oxyalkylene chains that have been introduced onto the molecule (referred to hereinafter as the "average molar substitution").

The average molar substitution (MS) serves here as an indicator of the number of moles of oxyalkylene groups that have been introduced onto the molecule per vinyl alcohol unit. In the polymeric compound of the invention, the average molar substitution must be at least 0.3, and is preferably at least 0.5, more preferably at least 0.7 and most preferably at least 1.0. No particular upper limit is imposed on the average molar substitution, although a value no higher than 20 is preferred. Too low an average molar substitution may result in the inability of the ion-conductive salt to dissolve, lower ion mobility and lower ionic conductivity. On the other hand, increasing the average molar substitution beyond a certain level fails to yield any further change in the solubility or mobility of the ion-conductive salt and is thus pointless.

Depending on its average degree of polymerization, the oxyalkylene chain-bearing polyvinyl alcohol unit-containing polymeric compound of the invention varies in appearance at room temperature (20° C.) from a highly viscous molasses-like liquid to a rubbery solid. The higher the average degree of polymerization, the more it qualifies as a solid (albeit, a soft, paste-like solid) having a low fluidity at room temperature.

Figure 2:
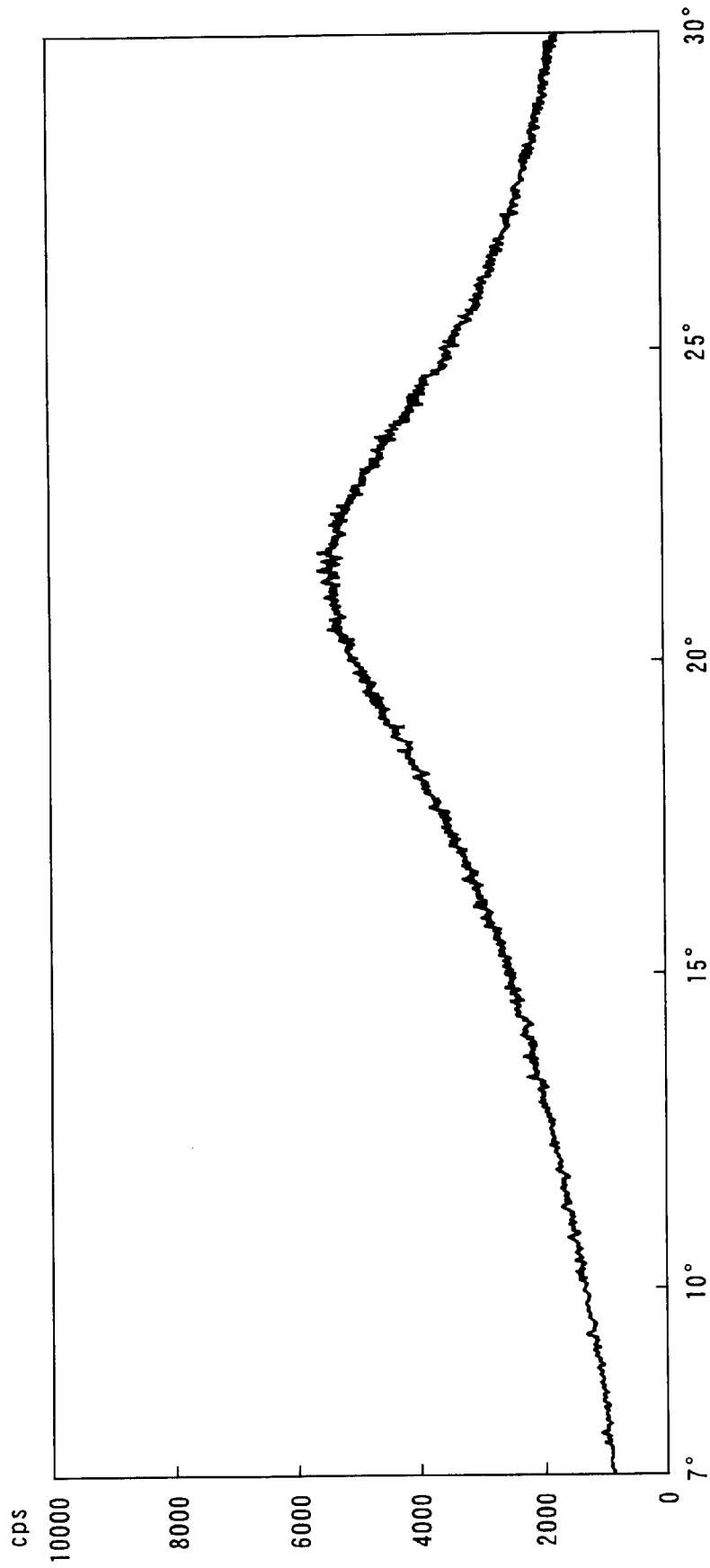
FIG. 2 shows a wide-angle x-ray diffraction pattern for the composition (complex) obtained in Example 15.

The polymeric compound of the invention, regardless of its average degree of polymerization, is not a linear polymer, but rather an amorphous polymer due to the entanglement of its highly branched molecular chains. As shown in FIG. 2, this is evident from the absence of any peaks in the wide-angle x-ray diffraction pattern that would suggest the presence of crystals.

The oxyalkylene chain-bearing polyvinyl alcohol unit-containing polymeric compound of the invention can be prepared as a capped hydroxyl-bearing polymer derivative by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituents selected from among halogen atoms, substituted or unsubstituted monovalent hydrocarbon groups having 1 to 10 carbons, $R^1CO$— groups (wherein $R^1$ is a substituted or unsubstituted monovalent hydrocarbon group of 1 to 10 carbons), $R^1_3Si$— groups ($R^1$ being as defined above), amino groups, alkylamino groups and phosphorus-containing groups.

The purpose of capping the hydroxyl groups on the inventive oxyalkylene chain-bearing polyvinyl alcohol unit-containing polymeric compound with the above substituents is two-fold.
(1) In a polymer containing a high concentration of ion-conductive salt, dissociated cations and counter ions (anions) will readily recombine in a low-dielectric-constant polymer matrix, lowering the conductivity. Because raising the polarity of the polymer matrix discourages ion association, one aim is to increase the dielectric constant of the matrix polymer by introducing polar groups at the hydroxyl groups of the oxyalkylene chain-bearing polyvinyl alcohol unit-containing polymeric compound.
(2) The second aim is to impart the polymer electrolyte-forming polymer with highly desirable characteristics, such as hydrophobic properties and fire retardance.

To increase the dielectric constant of the polymeric compound according to the first of these aims, the oxyalkylene chain-bearing polyvinyl alcohol unit-containing polymeric compound is reacted with a hydroxy-reactive compound so as to cap the hydroxyl end groups on the polymeric compound with highly polar substituents.

Although the highly polar substituents used for this purpose are not subject to any particular limitation, neutral substituents such as substituted or unsubstituted monovalent hydrocarbon groups with 1 to 10 carbons and $R^1CO$— groups (wherein $R^1$ is as defined above) are preferable to ionic substituents. If necessary, capping may also be carried out with other suitable substituents, such as amino groups and alkylamino groups.

The second purpose of capping mentioned above, which is to confer hydrophobic properties and fire retardance to the polymeric compound, can be achieved by the use of, for example, halogen atoms, $R^1_3Si$— groups ($R^1$ being as defined above) or phosphorus-containing groups to cap the hydroxyl groups on the polymeric compound.

Examples of halogen atoms that may be used as the substituent here include fluorine, bromine and chlorine. Examples of the substituted or unsubstituted monovalent hydrocarbon groups having 1 to 10 carbons, and preferably 1 to 8 carbons, that may be used as the substituent include the same as those mentioned above. Suitable examples of the $R^1$ moiety include the examples given above for $R^4$.

Examples of suitable $R^1_3Si$— groups include those in which $R^1$ represents the same substituted or unsubstituted monovalent hydrocarbon groups having 1 to 10 carbons, and preferably 1 to 6 carbons as above, and preferably an alkyl group. Of these, trialkylsilyl groups, and especially trimethylsilyl groups, are preferred.

Additional examples of suitable substituents include amino groups, alkylamino groups and phosphorus-containing groups.

The proportion of end groups capped with the above substituents is preferably at least 10 mol %, more preferably at least 50 mol %, and most preferably at least 90 mol %. It is even possible to cap substantially all the end groups with the above substituents, representing a capping ratio of essentially 100 mol %.

However, because there are cases in which the ability of the polymer to dissolve the ion-conductive salt decreases when all the hydroxyl end groups on the molecular chains of the polymer are capped with halogen atoms, $R^1_3Si$— groups or phosphorus-containing groups, it is necessary to introduce a suitable amount of substituent while taking into account the solvating ability of the polymer. This amount is preferably 10 to 95 mol %, more preferably 50 to 95 mol %, and most preferably 50 to 90 mol %, based on the total number of end groups (hydroxyl groups).

The substituent used in the practice of the invention is most preferably a cyanated monovalent hydrocarbon group. Illustrative examples include cyanoethyl, cyanobenzyl, cyanobenzoyl, and substituents having cyano groups bonded to other alkyl groups.

The use of a cyanated monovalent hydrocarbon group such as cyanoethyl in combination with a $R^1_3Si$— group such as trimethylsilyl is highly advantageous. In this case, the two components are used in relative proportions of preferably 70 to 97 mol %, and especially 90 to 97 mol %, of the cyanated monovalent hydrocarbon groups, and preferably 30 to 3 mol %, and especially 10 to 3 mol %, of the $R^1_3Si$— groups, based on all the hydroxyl end groups on the molecular chains. Polymer derivatives in which cyanated monovalent hydrocarbon groups and $R^1_3Si$— groups have been incorporated together in this way possess excellent electrical conductivity and hydrophobic properties.

If cyanoethyl groups are introduced as the substituent, the method for capping the molecular chains of the oxyalkylene chain-bearing polyvinyl alcohol unit-containing polymeric compound may comprise mixing the oxyalkylene chain-bearing polyvinyl alcohol unit-containing polymeric compound with dioxane and acrylonitrile, adding a sodium hydroxide solution to the mixture, and stirring to effect the reaction. This yields a cyanoethylated polymer derivative in which cyanoethyl groups have been introduced onto some or all of the side chains.

In cases where acetyl groups are introduced as the substituent, this may be carried out by, for example, mixing the oxyalkylene chain-bearing polyvinyl alcohol unit-containing polymeric compound with acetic acid and methylene chloride, adding an aqueous perchlorate solution and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated polymer derivative.

Cyanobenzoyl groups may be introduced as the substituent by a method which involves, for example, mixing the oxyalkylene chain-bearing polyvinyl alcohol unit-containing polymeric compound with dioxane, adding pyridine, then adding dropwise a solution of cyanobenzoyl chloride in dioxane. The solution is then reacted at a given temperature, after which the reaction mixture is poured into a methanol/water (3:4) solution. The precipitate that settles out of solution is collected, then dissolved in N,N-dimethylsulfoxide, following which the solution is placed in dialysis tubing and dialyzed. The resulting precipitate is collected, rinsed with water, then dried in vacuo, giving a cyanobenzoylated polymer derivative.

The introduction of trimethylsilyl groups may be carried out by dissolving the oxyalkylene chain-bearing polyvinyl alcohol unit-containing polymeric compound in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated polymer derivative.

Capping with other suitable substituents may likewise be carried out using known techniques for introducing those substituents onto hydroxyl end groups.

In the other embodiment, the inventive oxyalkylene chain-bearing polyvinyl alcohol unit-containing polymeric compound or polymer derivative thereof in which some or all of the hydroxyl groups on the molecule have been capped (polymer electrolyte-forming polymer) and which has been obtained as described above (component A) is conferred with ionic conductivity by the addition thereto of an ion-conductive salt (component B).

The ion-conductive salt serving as component B is not subject to any particular limitation so long as it can be used in conventional electrochemical devices. Illustrative examples include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_3SO_2)_2$ and $Et_4NPF_6$ (wherein Et is ethyl). Any one or combinations of two or more of these may be used.

The amount of the ion-conductive salt incorporated as component B varies empirically according to a number of factors, including the type of ion-conductive salt used, the molecular weight of the polymer electrolyte-forming polymer, and the type of capping substituent. In general, the amount of ion-conductive salt included per 100 parts by weight of the polymer electrolyte-forming polymer is preferably 5 to 1,000 parts by weight, more preferably 10 to 500 parts by weight, even more preferably 10 to 100 parts by weight, and most preferably 10 to 50 parts by weight. Too little ion-conductive salt results in a weak concentration of the ion conductor, making the electrical conductivity too low for practical purposes. On the other hand, the capacity of the polymer matrix to dissolve the ion-conductive salt is exceeded if too much salt is used, resulting in salt deposition.

In addition to above components (A) and (B), the ion-conductive polymer electrolyte composition of the invention may include also an ordinary amount of a solvent capable of dissolving the ion-conductive salt. Suitable examples of such solvents include chain ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and solvents commonly used in electrochemical devices, such as water, alcohol solvents (e.g., methanol, ethanol, butanol, ethylene glycol, propylene glycol, diethylene glycol, 1,4-butanediol and glycerol), polyoxyalkylene polyols (e.g., polyethylene oxide, polypropylene oxide, polyoxyethylene-oxypropylene glycol and mixtures of two or more thereof), amide solvents (e.g., N-methylformamide, N,N-dimethylformamide, N-methylacetamide and N-methylpyrrolidinone), carbonate solvents (e.g., diethyl carbonate, dimethyl carbonate, ethylmethyl carbonate, propylene carbonate, ethylene carbonate, styrene carbonate), and imidazolidinone solvents (e.g., 1,3-dimethyl-2-imidazolidinone). These solvents may be used singly or as mixtures of two or more thereof.

The polymer electrolyte composition of the invention varies in appearance at room temperature (20° C.) from a highly viscous molasses-like liquid to a rubbery solid. The higher the average degree of polymerization, the more it qualifies as a solid (albeit, a soft, paste-like solid) having a low fluidity at room temperature.

The ion-conductive salt in the ion-conductive polymer electrolyte composition of the invention has been confirmed to be completely dissociated within the polymer (see x-ray diffraction pattern in FIG. 2). In addition, the results of electrical conductivity measurements by the AC impedance technique show that a composition containing about 9 to 15 parts by weight of ion-conductive salt per 100 parts by weight of the polymer electrolyte-forming polymer has a high conductivity of about $10^{-3}$ to $10^{-4}$ S/cm.

The polymeric compound (binder resin) and ion-conductive polymer electrolyte composition of the invention have a bond strength of preferably at least 0.1 kN/m, more preferably at least 0.2 kN/m, and most preferably at least 0.4 kN/m, as measured according to the peel-type bond strength test standard for adhesives set forth in JIS K6854 (1994).

Thus, the polymer electrolyte composition of the invention remains amorphous without crystallizing, even when an ion-conductive salt is added thereto in high concentration. Moreover, because it has a high polyoxyalkylene fraction, metallic ions are able to move unimpeded through the molecule. These features, together with its high bond strength, make the inventive composition particularly well suited for use as a solid polymer electrolyte and a binder polymer in film-type cells and related applications.

The use of a polymeric compound having a low average degree of polymerization in the polymer electrolyte composition of the invention gives a liquid polymer electrolyte, whereas the use of a polymeric compound having a sufficiently high average degree of polymerization gives a solid polymer electrolyte. In both cases, the polymer electrolyte has a high tackiness. Even as a solid, because the polymer electrolyte is a rubbery solid which readily undergoes plastic deformation, it deforms easily under stress and can thus be easily formed into a film or sheet.

Next, the secondary cell of the invention comprises a positive electrode, a negative electrode, and a solid polymer electrolyte layer composed of the inventive ion conductive polymer electrolyte composition disposed between the positive electrode and the negative electrode.

The positive electrode used herein is preferably a composite positive electrode comprising a positive electrode current collector coated with a positive electrode dope composed of a mixture of the inventive binder resin and a positive electrode active material. It is also preferable for a solid polymer electrolyte layer composed of the ion-conductive polymer electrolyte composition of the invention to lie between the composite positive electrode and the negative electrode composed of lithium foil or the composite negative electrode obtained by coating a negative electrode current collector with a negative electrode dope containing the inventive binder resin and a negative electrode active material in admixture.

The positive electrode active material is selected as appropriate for the electrode application, the type of battery and other considerations. For instance, examples of positive electrode active materials that are suitable for use as the positive electrode in a lithium secondary cell include group I metal compounds such as CuO, $Cu_2O$, $Ag_2O$, CuS and $CuSO_2$; group IV metal compounds such as TiS, $SiO_2$ and SnO; group V metal compounds such as $V_2O_5$, $V_6O_{13}$, $Vo_x$, $Nb_2O_5$, $Bi_2O_3$ and $Sb_2O_3$; group VI metal compounds such as $CrO_3$, $Cr_2O_3$, $MoO_3$, $MoS_2$, $WO_3$ and $SeO_2$; group VII metal compounds such as $MnO_2$ and $Mn_2O_4$; group VIII metal compounds such as $Fe_2O_3$, FeO, $Fe_3O_4$, $Ni_2O_3$, NiO and $CoO_2$; and conductive polymeric compounds such as polypyrrole, polyaniline, poly(p-phenylene), polyacetylene and polyacene.

Calcogen compounds capable of adsorbing and releasing lithium ions and calcogen compounds containing lithium ions can be used as the positive electrode active material in lithium ion secondary cells.

Examples of the calcogen compounds capable of adsorbing and releasing lithium ions include $FeS_2$, $TiS_2$, $MoS_2$, $V_2O_5$, $V_6O_{13}$, and $MnO_2$.

Examples of the calcogen compounds containing lithium ions include $LiCoO_2$, $LiMnO_2$, $LiMn_2O_4$, $LiMo_2O_4$, $LiV_3O_8$, $LiNiO_2$, and $Li_xNi_yM_{1-y}O_2$ (wherein M stands for selected from Co, Mn, Ti, Cr, V, Al Sn, Pb, and Zn, $0.05 \leq x \leq 1.10$, and $0.5 \leq y \leq 1.0$.)

On use, the positive electrode active material is compounded with an ion-conductive solid polymer electrolyte, a binder and a conductive agent to form a composite positive electrode. The ion-conductive solid polymer electrolyte and binder resin used herein are preferably the ion-conductive solid polymer electrolyte and binder resin of the present invention, respectively. Suitable examples of the conductive agent include acetylene black and natural graphite.

The composite positive electrode may be formed to a thin film of uniform thickness by any suitable film-forming technique such as roller coating (with an applicator roll), screen coating, doctor blade coating, spin coating or bar coating.

The negative electrode active material is selected as appropriate for the electrode application, the type of battery and other considerations. For instance, examples of materials that are suitable for use as the negative electrode in lithium secondary cells and lithium ion secondary cells include alkali metals, alkali alloys, carbon materials, and the same materials mentioned above in regards to the positive electrode active material.

Illustrative examples of alkali metals include lithium, sodium and potassium. Examples of alkali metal alloys include metallic lithium, Li—Al, Li—Mg, Li—Al—Ni, sodium, Na—Hg and Na—Zn.

Examples of the carbon material include graphite, carbon black, coke, glassy carbon, carbon fibers, and sintered compacts thereof.

The negative electrode active material may be used alone, although its use as a composite negative electrode prepared by the addition of an ion-conductive solid polymer electrolyte, a binder, a conductive agent and the like is generally preferred. The ion-conductive solid polymer electrolyte and binder resin used herein are preferably the ion-conductive solid polymer electrolyte and binder resin of the present invention, respectively. Suitable examples of the conductive agent include acetylene black and natural graphite.

The composite negative electrode may be formed to a thin film of uniform thickness by any suitable film-forming technique such as roller coating (with an applicator roll), screen coating, doctor blade coating, spin coating or bar coating.

The use here of the inventive binder resin as the binder in the positive electrode, the negative electrode, and the ion-conductive solid polymer electrolyte layer which together constitute the secondary cell of the invention enables the powdery positive and negative electrode active materials to be firmly bound. Moreover, because the binder resin and the solid polymer electrolyte have the same composition, interfacial resistance between the electrodes and the solid electrolyte can be reduced. As a result, there can be obtained film-type batteries, particularly secondary cells (e.g., lithium secondary cells and lithium ion secondary cells), of outstanding performance which feature a high ionic conductivity and strong bonding between the electrodes and the solid electrolyte.

The following examples and comparative examples are provided to illustrate the invention, and are not intended to limit the scope thereof.

EXAMPLE 1

A reaction vessel equipped with a stirring element was charged with 10 parts by weight of polyvinyl alcohol (average degree of polymerization, 500; vinyl alcohol fraction, ≧98%) and 70 parts by weight of acetone. An aqueous solution of 1.81 parts by weight of sodium hydroxide in 2.5 parts by weight of water was gradually added under stirring, and stirring was continued for one hour at room temperature. To this solution was gradually added over a period of 3 hours a solution of 67 parts by weight of glycidol in 100 parts by weight of acetone. The resulting mixture was stirred for 8 hours at 50° C. to effect the reaction. When stirring was stopped following reaction completion, the polymer precipitated from the mixture. The precipitate was collected, dissolved in 400 parts by weight of water and neutralized with acetic acid. The neutralized polymer was purified by dialysis, and the resulting solution was freeze-dried, giving 22.50 parts by weight of a dihydroxypropylated polyvinyl alcohol.

The reaction product had the molecular structure shown below.

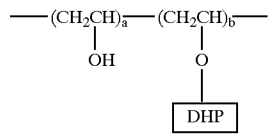

Here, DHP represents the dihydroxypropyl group which has formed as a result of glycidol addition. The structure is that of an oligomer chain having either of the two linkages shown below.

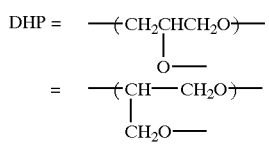

The molar substitution can be calculated as follows from the weight of the PVA charged and the weight of the product obtained.

(unit molecular weight of PVA)/(unit molecular weight of PVA derivative obtained by addition of $n$ units of glycidol)

$= 44/(44 + 74n)$ $= 10$ (weight of charged $PVA$)$/22.50$ (weight of product)

Thus, $n = 0.74$

The average molar substitution (MS) calculated from the yield is thus 0.74.

FIG. 1 shows the $^{13}$C-NMR spectrum (DEPT spectrum measured using a Varian VXR-300 NMR spectrometer, with $D_2O$ as the solvent) of this product.

The average molar substitution determined from the C* carbon signal intensity (A) of the —C*H$_2$—C(OH)H— units from the unreacted PVA and the signal intensity (C) of the other carbons was 0.95.

In addition, the fraction of unreacted —(CH$_2$—C(OH)H)— units determined by comparing signal intensities (A) and (C) was 0.57.

Accordingly, in the above formula, a=0.57 and b=0.43.

Hence, the average length L of the DHP chain is L=MS/b=2.21.

EXAMPLE 2

A dihydroxypropylated polyvinyl alcohol was prepared by the same method as in Example 1, except that 134 parts by weight of glycidol was used. The yield was 33.04 parts by weight and the average molar substitution (MS) by dihydroxypropyl units introduced onto the polyvinyl alcohol, as calculated from the yield, was 1.37. The MS determined from the NMR spectrum was 1.49. The ratio a:b was 0.6:0.4, and L was 3.73.

EXAMPLE 3

A reaction vessel equipped with a stirring blade was charged with 10 parts by weight of polyvinyl alcohol (average degree of polymerization, 500; vinyl alcohol fraction, ≧98%) and 150 parts by weight of dimethylsulfoxide. An aqueous solution of 1.81 parts by weight of sodium hydroxide in 2.5 parts by weight of water was gradually added under stirring, and stirring was continued for one hour at room temperature. To this solution was gradually added over a period of 3 hours a solution of 67 parts by weight of glycidol in 100 parts by weight of dimethylsulfoxide. The resulting mixture was stirred for 8 hours at 50° C. to effect the reaction. Following reaction completion, a uniform solution was obtained and so this was diluted with water and neutralized with acetic acid. The neutralized solution was purified by dialysis, and the resulting solution was freeze-dried, giving 30.01 parts by weight of a dihydroxypropylated polyvinyl alcohol. The average molar substitution by dihydroxypropyl units introduced onto the polyvinyl alcohol, as calculated from the yield, was 1.19. The molar substitution (MS) determined from the NMR spectrum was 1.23. The ratio a:b was 0.58:0.42, and L was 2.93.

EXAMPLE 4

A hydroxypropylated polyvinyl alcohol was prepared by the same method as in Example 3, except that 53 parts by weight of propylene oxide was used instead of glycidol. The yield was 24.63 parts by weight, and the average molar substitution by the hydroxypropyl units introduced onto the polyvinyl alcohol, as calculated from the yield, was 1.11. The molar substitution can also be calculated as follows.

(unit molecular weight of PVA)/(unit molecular weight of PVA derivative obtained by addition of $n$ units of propylene oxide)

$= 44/(44 + 58n)$

= (weight of charged $PVA$)/(weight of product)

Thus, $44/(44+58n) = 10/24.63$;

and so n=1.11.

The structural formula is shown below. The MS determined from the NMR spectrum was 1.3 and the ratio a:b was 0.61:0.39. Accordingly, L was 3.33.

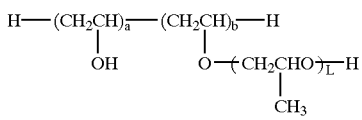

EXAMPLE 5

A reaction vessel equipped with a stirring blade was charged with 10 parts by weight of polyvinyl alcohol (average degree of polymerization, 500; vinyl alcohol fraction, ≧98%) and 150 parts by weight of dioxane. An aqueous solution of 1.81 parts by weight of sodium hydroxide in 2.5 parts by weight of water was gradually added under stirring, and stirring was continued for one hour at room temperature. To this solution was gradually added 84 parts by weight of phenol $(EO)_5$ glycidyl ether (Denacol EX-145, produced by Nagase Chemicals, Ltd.), and the resulting mixture was stirred for 8 hours at 50° C. to effect the reaction. When stirring was stopped following reaction completion, the polymer precipitated from the mixture. The precipitate was collected, dissolved in 400 parts by weight of water and neutralized with acetic acid. The neutralized polymer was purified by dialysis, and the resulting solution was freeze-dried, giving 53.72 parts by weight of a phenol $(EO)_5$-added polymer. The amount of $(EO)_5$ introduced, as calculated from the yield, was 0.52, and the MS was 2.6. The MS can also be calculated as follows.

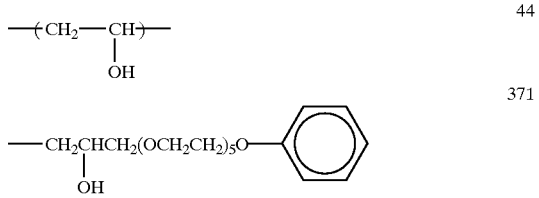

(unit molecular weight of PVA)/(unit molecular weight of PVA derivative obtained by addition of $n$ units of phenol $(EO)_5$)

$= 44/(44 + 370n)$

= (weight of charged $PVA$)/(weight of product)

Thus, $44/(44 + 370n) = 10/53.72$; and so $n = 0.52$ $MS = 0.52 \times 5 = 2.6$

The structural formula of the reaction product is shown below. The average molar substitution by the ethylene oxide units, as determined from the NMR spectrum, was 2.6.

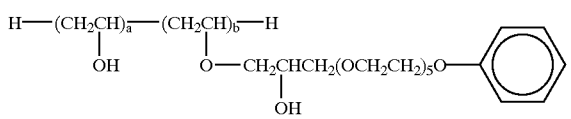

(a:b = 0.48:0.52)

(a:b=0.48:0.52)

EXAMPLE 6

A reaction vessel equipped with a stirring blade was charged with 10 parts by weight of partially saponified polyvinyl acetate (average degree of polymerization, 500; vinyl alcohol fraction, 77%) and 150 parts by weight of dimethylsulfoxide. An aqueous solution of 9.1 parts by weight of sodium hydroxide in 10 parts by weight of water was gradually added under stirring, and stirring was continued for one hour at room temperature. To this solution was gradually added over a period of 3 hours a solution of 67 parts by weight of glycidol in 100 parts by weight of dimethylsulfoxide. The resulting mixture was stirred for 8 hours at 50° C. to effect the reaction. Following reaction completion, a uniform solution was obtained and so this was diluted with water and neutralized with acetic acid. The neutralized solution was purified by dialysis, and the resulting solution was freeze-dried, giving 23.45 parts by weight of a dihydroxypropylated polyvinyl alcohol. The average molar substitution (MS) by the dihydroxypropyl units introduced onto the polyvinyl alcohol, as calculated from the yield, was 0.8. The MS determined from the NMR spectrum was 0.98. The ratio a:b was 0.48:0.52, and L was 1.88.

EXAMPLE 7

A reaction vessel equipped with a stirring blade was charged with 10 parts by weight of poly(ethylene vinyl alcohol) (average degree of polymerization, 400; vinyl alcohol fraction, 71%) and 100 parts by weight of dimethylsulfoxide. An aqueous solution of 1.29 parts by weight of sodium hydroxide in 7.3 parts by weight of water was gradually added under stirring, and stirring was continued for one hour at room temperature. To this solution was gradually added over a period of 3 hours a solution of 47.8 parts by weight of glycidol in 40 parts by weight of dimethylsulfoxide. The resulting mixture was stirred for 8 hours at 50° C. to effect the reaction. Following reaction completion, a uniform solution was obtained and so this was diluted with water and neutralized with acetic acid. The neutralized solution was purified by dialysis, and the resulting solution was freeze-dried, giving 25.0 parts by weight of a dihydroxypropylated poly(ethylene vinyl alcohol). The average molar substitution (MS) by the dihydroxypropyl units introduced onto the poly(ethylene vinyl alcohol), as calculated from the yield, was 0.8. The MS can also be calculated as follows.

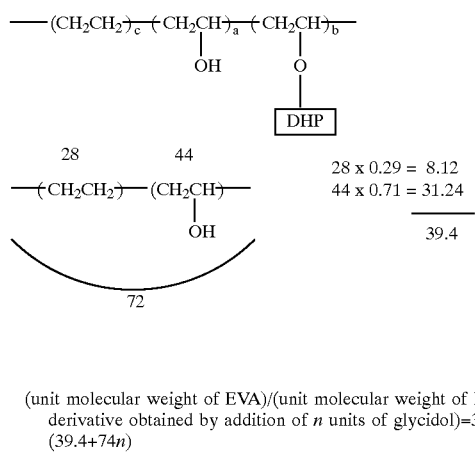

(unit molecular weight of EVA)/(unit molecular weight of EVA derivative obtained by addition of $n$ units of glycidol)=39.4/(39.4+74$n$)

=(weight of charged PVA)/(weight of product)

Thus, $39.4/(39.4+74n)=10/25.0;$ and so $n=0.8$

The MS determined from the NMR spectrum was 0.82. The percent conversion of the PVA unit portions on the molecule is apparent from the ratio c:a:b, which was 0.29:0.53:0.18. L was found from this to be 4.44.

TABLE 1

| | Starting polymer (average degree of polymerization) | PVA unit fraction | Reagent | MS calculated from yield |
|---|---|---|---|---|
| Example 1 | PVA (500) | ≧98% | glycidol | 0.74 |
| Example 2 | PVA (500) | ≧98% | glycidol | 1.37 |
| Example 3 | PVA (500) | ≧98% | glycidol | 1.19 |
| Example 4 | PVA (500) | ≧98% | propylene oxide | 1.11 |
| Example 5 | PVA (500) | ≧98% | phenol (EO)$_5$ glycidyl ether | 2.6 |
| Example 6 | partially saponified polyvinyl acetate (500) | 77% | glycidol | 0.8 |
| Example 7 | poly(ethylene vinyl alcohol) (400) | 71% | glycidol | 0.8 |

EXAMPLE 8

Cyanoethylation

Three parts by weight of the polymer prepared in Example 1 was mixed with 20 parts by weight of dioxane and 14 parts by weight of acrylonitrile. To this mixed solution was added an aqueous solution of 0.16 part by weight of sodium hydroxide in 1 part by weight of water, and stirring was carried out for 10 hours at 25° C. The resulting mixture was neutralized using the ion-exchange resin produced by Organo Corporation under the trade name Amberlite IRC-76. The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and dissolved in acetone again. The resulting solution was filtered, following which the acetone was evaporated off, giving a cyanoethylated polymer derivative. The polymer derivative was dried in vacuo, then used to measure the electrical conductivity. The infrared absorption spectrum of this polymer derivative showed no hydroxyl group absorption, confirming that all the hydroxyl groups were capped with cyanoethyl groups (capping ratio, 100%).

EXAMPLES 9 TO 14

Cyanoethylation

Cyanoethylated polymer derivatives were prepared in the same manner as in Example 8 by cyanoethylating the polymers obtained in Examples 2 to 7. The infrared absorption spectra of the resulting polymer derivatives showed no hydroxyl group absorption, confirming that all the hydroxyl groups in each case were capped with cyanoethyl groups (capping ratio, 100%).

EXAMPLES 15 TO 21

Next, the cyanoethylated polymer derivatives prepared in Examples 8 to 14 were dissolved together with lithium perchlorate in tetrahydrofuran. In each case, the lithium perchlorate and the polymer derivative were charged such that their combined weight per mole of lithium perchlorate was 1 kg. The resulting solutions were held under a reduced pressure to evaporate off the tetrahydrofuran, thereby giving the polymer derivative-lithium perchlorate complexes (ion-conductive polymer electrolyte compositions) of Examples 15 to 21.

The conductivity and bond strength of each of the resulting compositions were measured by the methods described below. In addition, the room temperature state of the composition was visually assessed. The crystallinity was determined by carrying out wide-angle x-ray diffraction analysis (FIG. 2 shows the x-ray diffraction pattern for the composition (complex) prepared in Example 15 from the polymer derivative of Example 8 and lithium perchlorate). The compositions obtained in these examples were also held at 100° C. for 5 hours, and the percent weight loss by evaporation was measured. The results are presented in Table 2.

Conductivity:

The cured composition was placed between two copper sheets separated by a 200 $\mu$m gap, and the conductivity was determined by AC impedance measurement.

Bond Strength:

The bond strength was measured according to the peel-type bond strength test standard for adhesives set forth in JIS K6854. Specifically, a T-peel test piece having a thickness of 0.6 mm, a width of 25.45±0.2 mm, and a length of 300 mm was prepared from a copper plate that had been surface-treated with sandpaper as the adherend. To carry out measurement, both ends of the test piece were attached to fixable crossheads on a testing machine, the cross-head rate was set at 100±0.2 mm/min, and crosshead movement was continued until the portion of the test piece remaining bonded was about 10 mm. The measurement results were subjected to best-fit straight line approximation, and the peel-type bond strength was determined from the resulting peel load in accordance with JIS Z8401.

Comparative Example 1

A polyethylene glycol-lithium perchlorate complex (ion-conductive polymer electrolyte composition) was prepared by the same method as in Example 15, except that polyethylene glycol having a weight-average molecular weight of 2000 (PEG 2000) was used as the polymer.

The conductivity and bond strength of the resulting complex were measured by the methods described above, and the room-temperature state was visually assessed. The crystallinity was determined by wide-angle x-ray diffraction analysis. In addition, the complex was held at 100° C. for 5 hours, and the percent weight loss by evaporation was measured. The results are presented in Table 3.

Comparative Example 2

A hydroxypropyl cellulose-lithium perchlorate complex (ion-conductive polymer electrolyte composition) was prepared by the same method as in Example 15, except that hydroxypropyl cellulose was used as the polymer.

The conductivity and bond strength of the resulting complex were measured by the methods described above, and the room-temperature state was visually assessed. The crystallinity was determined by wide-angle x-ray diffraction analysis. In addition, the complex was held at 100° C. for 5 hours, and the percent weight loss by evaporation was measured. The results are presented in Table 3.

Comparative Example 3

A cyanoethylated hydroxypropyl cellulose-lithium perchlorate complex (ion-conductive polymer electrolyte composition) was prepared by the same method as in Example 15, except that cyanoethylated hydroxypropyl cellulose was used as the polymer.

The conductivity and bond strength of the resulting complex were measured by the methods described above, and the room-temperature state was visually assessed. The crystallinity was determined by wide-angle x-ray diffraction analysis. In addition, the complex was held at 100° C. for 5 hours, and the percent weight loss by evaporation was measured. The results are presented in Table 3.

TABLE 2

| | Conductivity (S/cm) | Bond strength (kN/m) | Crystallinity | Room-temperature state | Weight loss by evaporation |
|---|---|---|---|---|---|
| Example 15 | $5.2 \times 10^{-4}$ | 0.74 | amorphous | rubbery solid | ≦0.1% |
| Example 16 | $2.23 \times 10^{-4}$ | 0.72 | amorphous | rubbery solid | ≦0.1% |
| Example 17 | $1.2 \times 10^{-4}$ | 0.7 | amorphous | rubbery solid | ≦0.1% |

TABLE 2-continued

| | Conductivity (S/cm) | Bond strength (kN/m) | Crystallinity | Room-temperature state | Weight loss by evaporation |
|---|---|---|---|---|---|
| Example 18 | $1.57 \times 10^{-4}$ | 0.82 | amorphous | rubbery solid | ≦0.1% |
| Example 19 | $0.88 \times 10^{-4}$ | 0.83 | amorphous | rubbery solid | ≦0.1% |
| Example 20 | $0.78 \times 10^{-4}$ | 0.56 | amorphous | rubbery solid | ≦0.1% |
| Example 21 | $1.1 \times 10^{-4}$ | 0.43 | amorphous | rubbery solid | ≦0.1% |

TABLE 3

| | Comp. Ex. 1 | Comp. Ex. 2 | Comp. Ex. 3 |
|---|---|---|---|
| Conductivity (S/cm) | $8.2 \times 10^{-6}$ | $7.0 \times 10^{-6}$ | $6 \times 10^{-4}$ |
| Bond strength (kN/m) | <0.01 (not measurable) | <0.01 (not measurable) | <0.1 (weak adhesion) |
| Crystallinity | crystalline | semi-crystalline | amorphous |
| Room-temperature state | solid | solid | rubbery solid |
| Weight loss by evaporation | ≦0.1% | ≦0.1% | ≦0.1% |

The polymeric compound of the invention, the binder resin composed of this polymeric compound, and the inventive ion-conductive polymer electrolyte composition obtained by adding an ion-conductive salt to this polymer electrolyte-forming polymer have a high ionic conductivity and a high tackiness, making them highly suitable for use as solid polymer electrolytes and binder polymers for film-type cells and related applications.

EXAMPLE 22

Preparation of Ion-Conductive Solid Polymer Electrolyte Film-Type Battery

The positive electrode was fabricated by blending a powder mixture of $LiCoO_2$ and Ketjen Black in a weight ratio of 90:10 with the polymer derivative (liquid I) of Example 8 so that the weight ratio of the polymer derivative and the powder mixture is 1:10 and adding suitable amounts of N-methy pyrrolidone thereto, thereby obtaining a positive electrode dope. Using a doctor knife applicator, the positive electrode dope was cast onto a positive electrode current collector in the form of aluminum foil, then held at 80° C. for 1 hours to render it into a semisolid state, thereby giving a sheet-like composite positive electrode.

For the negative electrode, lithium foil was used. The lithium foil was press-bonded onto a stainless steel current collector.

Next, the ion-conductive polymer electrolyte composition (liquid II) of Example 15 was placed in a slight excess on the surface of the negative electrode lithium foil. The sheet-like composite positive electrode was stacked on top thereof such as to face the negative electrode across a gap of 25 μm between the surface of the composite positive electrode and the lithium foil surface of the negative electrode, and pressure was applied. The electrodes were held in this state at about 80° C. for 6 hours to effect curing. This caused the ion-conductive polymer electrolyte composition (liquid II) disposed between the sheet-like composite positive electrode and the lithium foil of the negative electrode to thermally polymerize, resulting in the formation of a solid polymer electrolyte layer and thus giving an ion-conductive solid polymer electrolyte film-type battery.

The resulting film-type battery had an aluminum foil/composite positive electrode/cured liquid II/lithium foil/stainless steel current collector construction, was rechargeable, and clearly functioned effectively as a lithium secondary battery.

EXAMPLE 23

An ion-conductive solid polymer electrolyte film-type battery was fabricated in the same method as in Example 22 except that the negative electrode was prepared by using graphite as the active material, mixing the polymer derivative (liquid I) of Example 8 with graphite so that the weight ratio of the polymer derivative and the active material is 1:9 and adding suitable amounts of N-methyl pyrrolidone as a diluent, thereby obtaining a negative electrode dope. Casting the negative electrode dope onto a negative electrode current collector in the form of copper foil by means of a doctor knife applicator, and allowing the coating to stand at 80° C. for 1 hours, yielding a sheet-like composite negative electrode in semi-solid state.

The resulting film-type battery had an aluminum foil/composite positive electrode/cured liquid II/composite negative electrode/copper foil construction, was rechargeable, and clearly functioned effectively as a lithium battery.

What is claimed is:

1. A polymeric compound comprising polyvinyl alcohol units of formula (1)

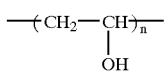

(1)

wherein n is a number of at least 20, and having an average degree of polymerization of at least 20, characterized in that some or all of the hydroxyl groups on the polyvinyl alcohol units are substituted with oxyalkylene-containing groups to an average molar substitution of at least 0.3, wherein some or all of the hydroxyl groups on the molecule, which include the remaining hydroxyl groups on the polyvinyl alcohol units of the polymeric compound, are capped with monovalent substituents of at least one type selected from the class consisting of halogen atoms, substituted or unsubstituted monovalent hydrocarbon groups of 1 to 10 carbons, $R^1CO$— groups wherein $R^1$ is a substituted or unsubstituted monovalent hydrocarbon group of 1 to 10 carbons, $R^1_3Si$— groups wherein $R^1$ is as defined above, amino groups, alkylamino groups and phosphorus-containing groups.

2. The polymeric compound of claim 1, wherein the oxyalkylene-containing groups have been introduced by reacting a polymeric compound comprising said polyvinyl alcohol units with at least one oxirane compound selected from among ethylene oxide, propylene oxide and glycidol.

3. The polymeric compound of claim 1, wherein the oxyalkylene-containing groups have been introduced by reacting a polymeric compound comprising said polyvinyl alcohol units with a polyoxyalkylene compound having a hydroxy-reactive substituent at the end.

4. The polymeric compound of claim 3, wherein the hydroxy-reactive substituent on the polyoxyalkylene compound is selected from the class consisting of isocyanate groups, epoxy groups, carboxylic groups, carboxylic acid chloride groups, ester groups, amide groups, halogen atoms and silicon-bearing reactive substituents.

5. The polymeric compound of claim 1, wherein at least a cyano-substituted monovalent hydrocarbon group is used to cap the hydroxyl groups on the molecule.

6. A binder resin comprising a polymeric compound claim 1.

7. The binder resin of claim 6 having a bond strength of at least 0.1 kN/m according to JIS K6854.

8. An ion-conductive polymer electrolyte composition comprising the polymer electrolyte-forming polymer of claim 6 and an ion-conductive salt.

9. The ion-conductive polymer electrolyte composition of claim 8 having a bond strength of at least 0.1 kN/m according to JIS K6854.

10. A secondary cell comprising a positive electrode, a negative electrode and a solid polymer electrolyte layer, characterized in that the solid polymer electrode layer is comprised of the ion-conductive polymer electrolyte composition of claim 8 and lies between the positive electrode and the negative electrode.

11. The secondary cell of claim 10 wherein the positive electrode is a composite positive electrode comprising a positive electrode current collector coated with a positive electrode dope composed of the binder resin and an active positive electrode material in admixture, and the solid polymer electrolyte layer comprised of the ion-conductive polymer electrolyte composition lies between the composite positive electrode and the negative electrode composed of lithium foil or a composite negative electrode obtained by coating a negative electrode current collector with a negative electrode dope containing the binder resin and a negative electrode active material in admixture.

* * * * *